United States Patent
Koga et al.

(10) Patent No.: US 7,153,342 B2
(45) Date of Patent: Dec. 26, 2006

(54) EXHAUST GAS PURIFYING SYSTEM OF INTERNAL COMBUSTION ENGINE

(75) Inventors: Toshimasa Koga, Yokohama (JP); Junichi Kawashima, Kanagawa (JP); Naoya Tsutsumoto, Yokohama (JP); Terunori Kondou, Yokohama (JP); Makoto Otake, Yokohama (JP); Takao Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 257 days.

(21) Appl. No.: 10/752,519

(22) Filed: Jan. 8, 2004

(65) Prior Publication Data

US 2004/0139852 A1 Jul. 22, 2004

(30) Foreign Application Priority Data

Jan. 10, 2003 (JP) ............................ 2003-004967

(51) Int. Cl.
 *B01D 46/00* (2006.01)
(52) U.S. Cl. .................. 95/20; 95/19; 95/273; 95/278; 55/282.2; 55/282.3; 55/385.3; 55/523; 55/DIG. 10; 55/DIG. 30; 96/421; 60/274; 60/311
(58) Field of Classification Search .............. 55/282.3, 55/282.2, 385.3, 523, DIG. 10, DIG. 30; 60/273, 274, 286, 287, 295, 297, 299, 303, 60/311; 95/19, 20, 273, 278; 96/421
See application file for complete search history.

(56) References Cited

U.S. PATENT DOCUMENTS 5,287,698 A * 2/1994 Shinzawa et al. ............. 60/286
6,405,528 B1 * 6/2002 Christen et al. ............... 60/311
6,622,480 B1 * 9/2003 Tashiro et al. ................. 60/311
6,928,809 B1 * 8/2005 Inoue et al. .................... 60/311
6,941,750 B1 * 9/2005 Boretto et al. ......... 55/DIG. 30
2001/0010152 A1 * 8/2001 Tallec et al. ................... 60/311
2003/0131592 A1 * 7/2003 Saito et al. .................... 60/311

FOREIGN PATENT DOCUMENTS

EP          0 402 705 A1 * 12/1990

(Continued)

OTHER PUBLICATIONS

U.S. Appl. No. 10/755,316, filed Jan. 13, 2004, Otake et al.

(Continued)

*Primary Examiner*—Jason M. Greene
(74) *Attorney, Agent, or Firm*—Foley & Lardner LLP (57) ABSTRACT

An exhaust gas purifying system of a diesel engine comprises a PM filter installed in an exhaust passage line of the engine to collect particulate matter (PM) in the exhaust gas from the engine; a pressure difference sensor for detecting a pressure difference between upstream and downstream portions of the PM filter; a control unit which comprises a collected PM amount estimating section that estimates an amount of collected PM in the PM filter based on the pressure difference; and a reactivation timing judging section that, based on the estimated amount of the collected PM, judges a reactivation time when the reactivation of the PM filter is needed; and a reactivation carrying out system that, upon judgment of the reactivation time, carries out a predetermined operation to increases the temperature of the PM filter thereby to burn the collected PM. The control unit further comprises a dispersion condition judging section that judges a dispersion condition of the collected PM in the PM filter; and a correction section that corrects the estimated amount of the collected PM in accordance with the judged dispersion condition of the collected PM.

14 Claims, 8 Drawing Sheets

FOREIGN PATENT DOCUMENTS

| | | | |
|---|---|---|---|
| EP | 1 103 702 A2 * | 5/2001 | |
| EP | 1 229 223 A1 * | 8/2002 | |
| JP | 3-199614 A | 8/1991 | |
| JP | 5-231131 A | 9/1993 | |
| JP | 5-240026 A | 9/1993 | |
| JP | 5-313022 A | 11/1993 | |
| JP | 7-34853 A | 2/1995 | |

OTHER PUBLICATIONS

U.S. Appl. No. 10/756,502, filed Jan. 14, 2004, Kondou et al.

U.S. Appl. No. 10/752,427, filed Jan. 7, 2004, Inoue et al.

U.S. Appl. No. 10/752,518, filed Jan. 8, 2004, Koga et al.

U.S. Appl. No. 10/751,883, filed Jan. 7, 2004, Inoue et al.

Patent Abstracts of Japan, vol. 1996, No. 03, Mar. 29, 1996, JP 07-310524, Nov. 28, 1995.

Patent Abstracts of Japan, vol. 1999, No. 11, Sep. 30, 1999, JP 11-153020, Jun. 8, 1999.

Patent Abstracts of Japan, vol. 013, No. 122, Mar. 27, 1989, JP 63-295815, Dec. 2, 1988.

* cited by examiner

AFTER COMPLETE REACTIVATION (EVEN DISPERSION)

FIG.8B

AFTER PARTIAL REACTIVATION (UNEVEN DISPERSION)

EXHAUST GAS PURIFYING SYSTEM OF INTERNAL COMBUSTION ENGINE

BACKGROUND OF THE INVENTION

1. Field of the Invention

The present invention relates in general to exhaust gas purifying systems of an internal combustion engine, and more particularly to the exhaust gas purifying systems of a type that is equipped with a PM collecting filter that collects PM (viz., particulate matter) in the exhaust gas from the engine. More specifically, the present invention is concerned with a technique for timely reactivating the PM collecting filter.

2. Description of the Related Art

Hitherto, various exhaust gas purifying systems of the above-mentioned type have been proposed and put into practical use particularly in the field of diesel engines. One of them is described in Laid-open Japanese Application (Tokkaihei) 7-34853. In this system, a PM collecting filter is installed in an exhaust passage line of a diesel engine, and the filter is subjected to a heating for its reactivation at a given reactivation time. With the heating, the PM is burnt away and thus removed from the filter thereby to achieve a reactivation of the filter. For finding the reactivation time, a clogging degree of the filter is practically used, which controls the pressure loss at the position downstream of the filter. That is, under operation of the engine, exhaust pressures at positions upstream and downstream of the filter are monitored. By measuring a pressure difference between the two exhaust pressures, an amount of the PM collected by the filter is estimated, and when the estimated amount of the collected PM exceeds a predetermined value, it is judged that the reactivation time has come.

SUMMARY OF THE INVENTION

Usually, collection of the PM starts from a downstream area of the filter. However, upon starting of the reactivation, a center area of the filter shows a higher temperature than a peripheral area of the same, and thus, upon starting of the reactivation, burning of the PM starts from the center area of the filter and then gradually spreads toward the peripheral area of the same. Thus, when, under reactivation of the filter, the operation of the engine is changed to such a condition as not to allow continuation of the reactivation and thus the reactivation of the filter is stopped, the filter is brought to a partial reactivation condition. Under this condition, burning of the PM collected in the peripheral area of the filter is not sufficiently carried out, which brings about an uneven dispersion of the PM in the entire area of the filter. Such uneven dispersion of the PM causes the upstream and downstream portions of the filter to show a lower pressure difference therebetween as compared with a case wherein the PM is evenly dispersed in the entire area of the filter. This means that the relationship between the pressure difference and the amount of collected PM changes between a case wherein the reactivation has been fully made and a case wherein the reactivation has been partially made. This undesired change or estimation error of the relationship tends to interrupt the exhaust gas purifying system from exhibiting a satisfied performance.

Accordingly, it is an object of the present invention to provide an exhaust gas purifying system of an internal combustion engine, which is free of the above-mentioned drawback.

According to a first aspect of the present invention, there is provided an exhaust gas purifying system of an internal combustion engine, which comprises a PM filter installed in an exhaust passage line extending from the engine, the PM filter collecting particulate matter (PM) in the exhaust gas from the engine; a pressure difference sensor for detecting a pressure difference between upstream and downstream portions of the PM filter; a control unit which includes a collected PM amount estimating section that estimates an amount of collected PM in the PM filter based on the pressure difference; and a reactivation timing judging section that, based on the estimated amount of the collected PM, judges a reactivation time when the reactivation of the PM filter is needed; and a reactivation carrying out system that, upon judgment of the reactivation time, carries out a predetermined operation to increases the temperature of the PM filter thereby to burn the collected PM in the PM filter, wherein the control unit further comprises a dispersion condition judging section that judges a dispersion condition of the collected PM in the PM filter; and a correction section that corrects the estimated amount of the collected PM in accordance with the judged dispersion condition of the collected PM.

According to a second aspect of the present invention, there is provided an exhaust gas purifying system of a diesel engine having an exhaust passage line, which comprises a PM filter installed in the exhaust passage line for collecting particulate matter (PM) in the exhaust gas from the engine; a pressure difference sensor for detecting a pressure difference between upstream and downstream portions of the PM filter; a reactivation carrying out system that, upon need of a reactivation of the PM filter, carries out a predetermined operation to increase the temperature of the PM filter thereby to burn the collected PM in the PM filter; and a control unit that controls the operation of the reactivation carrying out system, wherein the control unit comprises a collected PM amount estimating section that estimates an amount of collected PM in the PM filter based on the pressure difference at the PM filter; a dispersion condition judging section that judges a dispersion condition of the collected PM in the PM filter; a correction section that corrects the estimated amount of the collected PM in accordance with the judged dispersion condition of the collected PM; and a reactivation timing judging section that, based on the corrected estimated amount of the collected PM, judges a reactivation time when the reactivation of the PM is actually needed.

According to a third aspect of the present invention, there is provided a method for operating an exhaust gas purifying system of an internal combustion engine including a PM filter that is installed in an exhaust passage line extending from the engine for collecting particulate matter (PM) in the exhaust gas from the engine, a pressure difference sensor that detects a pressure difference between upstream and downstream portions of the PM filter, a reactivation carrying out system that, upon need of a reactivation of the PM filter, carries out a predetermined operation to increase the temperature of the PM filter thereby to burn the collected PM in the PM filter. The method comprises estimating an amount of collected PM in the PM filter based on the pressure difference; judging a dispersion condition of the collected PM in the PM filter; correcting the estimated amount of the collected PM in accordance with the judged dispersion condition of the collected PM; judging, based on the corrected estimated amount of the collected PM, a reactivation time when the reactivation of the PM filter is needed; and operating the reactivation carrying out system upon judgment of the reactivation time.

DETAILED DESCRIPTION OF THE EMBODIMENTS

In the following, first and second embodiments 100 and 200 of the present invention will be described in detail with reference to the accompanying drawings.

Figure 1:
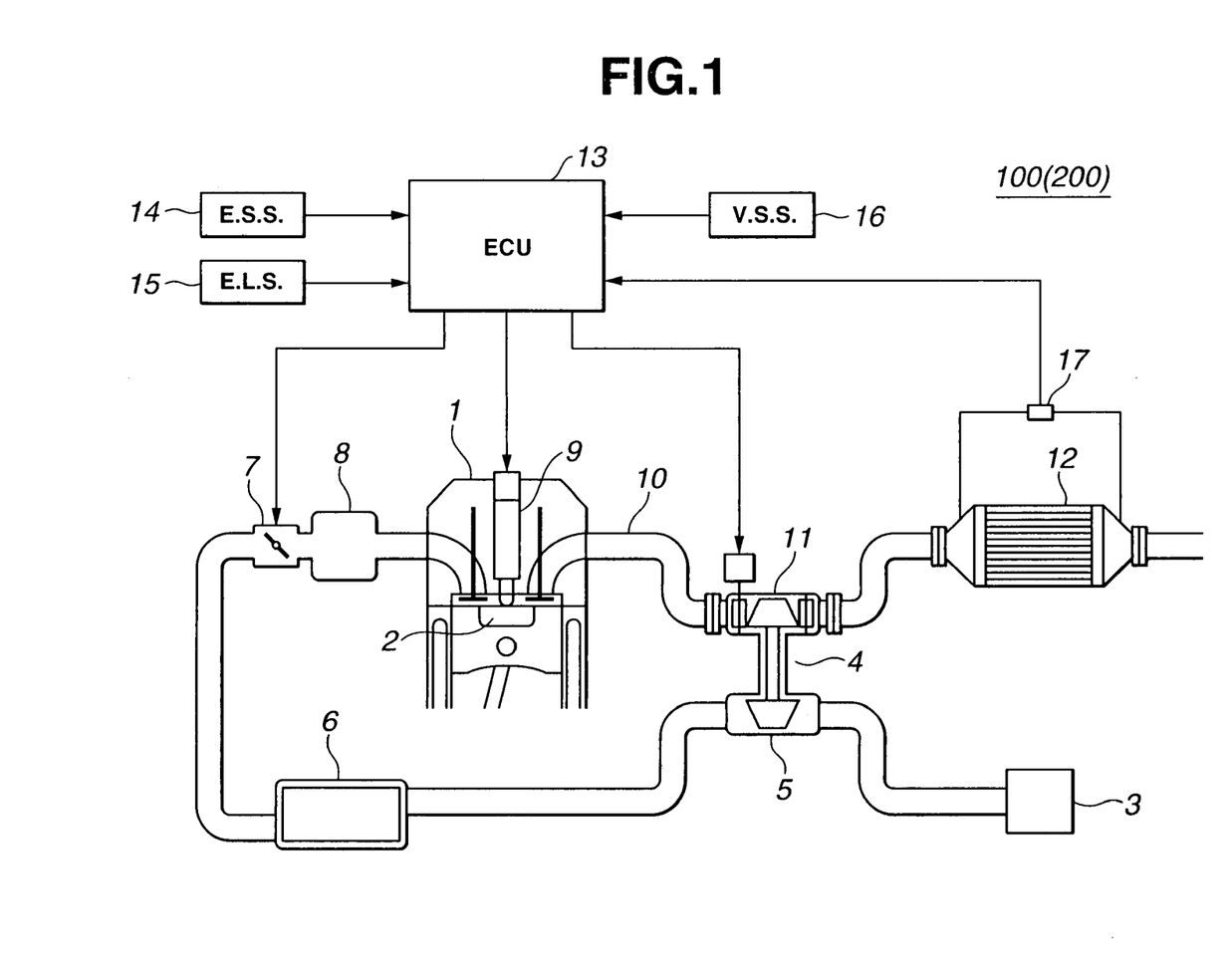
FIG. 1 is a schematic diagram of a diesel engine to which the present invention is practically applied.

Referring to FIG. 1, there is schematically shown a diesel engine 1 to which the first and second embodiments 100 and 200 of the present invention are practically applied.

As shown in the drawing, into a combustion chamber 2 of each cylinder of diesel engine 1, there is introduced air through an intake system which generally comprises an air cleaner 3, an intake air compressor 5, an intercooler 6, an intake throttle valve 7 and an intake manifold 8. Intake air compressor 5 is a part of a variable throat type supercharger 4, as shown. A fuel feeding system generally comprises a common rail (not shown) that has a highly pressurized fuel contained therein, and a fuel injection valve 9 that is connected to the common rail to inject the pressurized fuel into its associated combustion chamber 2 at a controlled timing. That is, fuel injection (viz., main injection) is carried out in a compression stroke and firing of fuel is started by a compression ignition. Exhaust gas produced as a result of combusting fuel is discharged to an open air through an exhaust system which generally comprises an exhaust manifold 10, an exhaust turbine 11 and a diesel particulate filter (viz., DPF) 12. Exhaust turbine 11 is a part of the above-mentioned variable throat type supercharger 4.

The DPF 12 is a filter that collects and burns particulate matter (viz., PM) in the exhaust gas thereby to clean the exhaust gas.

Figure 2:
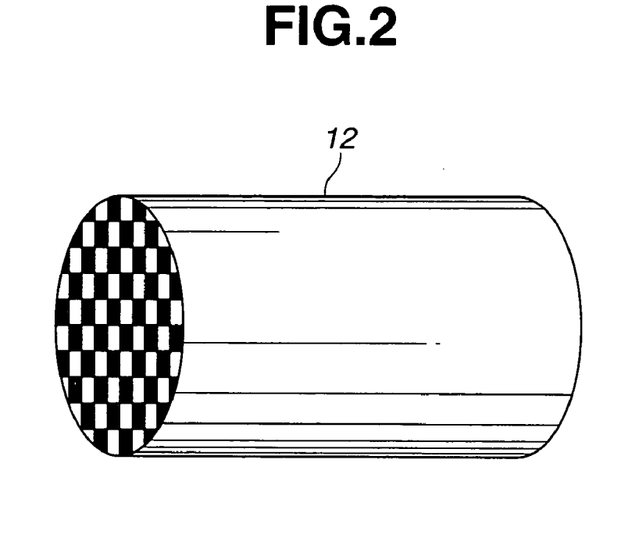
FIG. 2 is a sketch of a DPF (viz., diesel particulate filter) employed in the invention.

As is seen from FIG. 2, DPF 12 comprises a cylindrical honeycomb structure of porous ceramic and a cylindrical case (not shown) that holds therein the cylindrical honeycomb structure through a holding mat (not shown).

Figure 3:
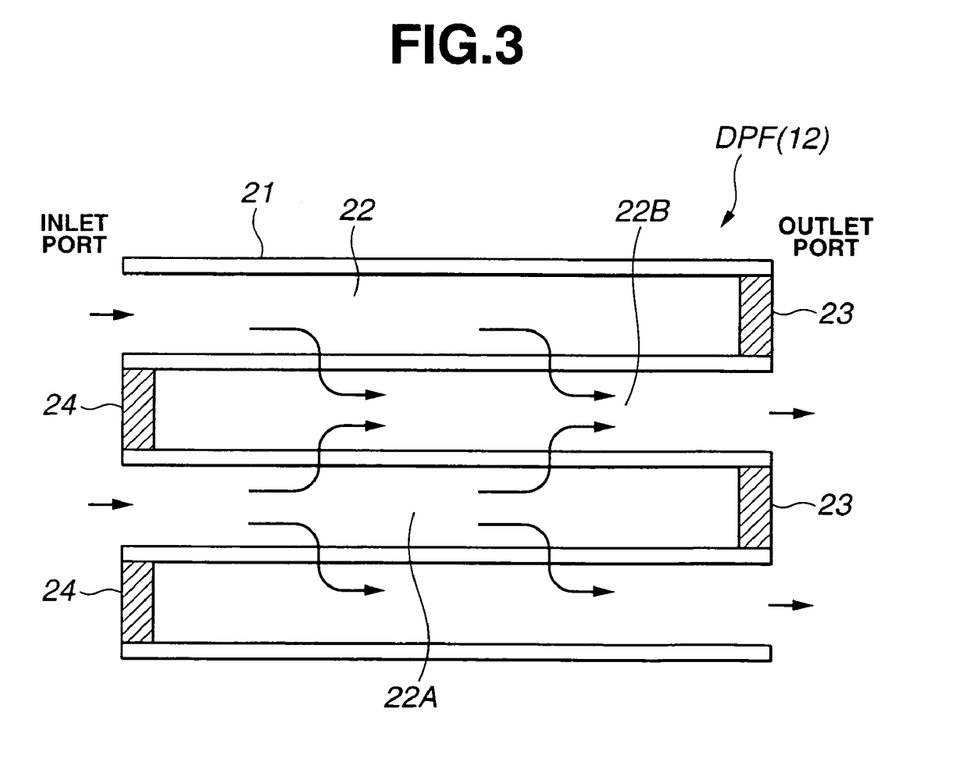
FIG. 3 is an enlarged sectional view of a part of the DPF of FIG. 2.

As is seen from FIG. 3 that shows a longitudinally sectional view of the interior of DPF 12 in an enlarged scale, the honeycomb structure of porous ceramic has a plurality of parallel cell spaces 22 each being enclosed by four longitudinally extending porous cell walls 21. As shown, each cell space 22 extends in the direction along which the exhaust gas flows. Cell spaces 22 are grouped into two, namely, first and second types 22A and 22B which are arranged alternately. As shown, cell spaces 22A of the first group have each a plug material 23 at outlet ends, and cell spaces 22B of the second group have each a plug material 24 at inlet ends. Thus, as is understood from the arrows that indicate the flow of the exhaust gas, cell spaces 22A of the first group are so-called exhaust gas inlet spaces and cell spaces 22B of the second group are so-called exhaust gas outlet spaces.

Under operation of the associated diesel engine 1, exhaust gas from engine 1 is led into the first group cell spaces 22A and then into the second group cell spaces 22B while being filtered by the porous cell walls 21. Thus, PM in the exhaust gas can be collected by porous cell walls 21.

When the amount of PM collected by the walls 21 is increased, exhaust flow resistance of DPF 12 is increased, which affects the operation of engine 1.

According to the present invention, when a predetermined reactivation time comes, a certain operation is carried out to heat up the exhaust gas led into DPF 12. With the heating of the exhaust gas, the collected PM is burnt and thus removed from DPF 12 to reactivate the same. As will be described in detail hereinafter, for heating up the exhaust gas or burning the collected PM, various measures are used, which are, for example, retardation of fuel injection timing of fuel injection valves 9, post-injection that is an additional fuel injection carried out in an expansion or exhaust stroke of piston, reducing the open degree of intake throttle valve 7, reducing the super-charged pressure generated by variable throat type supercharger 4, etc.,.

Referring back to FIG. 1, for carrying out the above-mentioned operation, an engine control unit 13 (ECU) is employed, which controls fuel injection valves 9, intake throttle valve 7 and variable throat type supercharger 4. For the control, information signals from an engine speed sensor (E. S. S) 14 that senses the engine speed, an engine load sensor (E. L. S) 15 that, for example, detects an open degree of an accelerator, a vehicle speed sensor (V.S.S) 16 that detects a running speed of an associated vehicle and a pressure difference sensor 17 that detects a pressure difference between upstream and downstream portions of DPF 12 are fed to the engine control unit 13. By the pressure difference sensor 17, a pressure loss caused by the DPF is sensed.

For ease of description, the pressure difference between upstream and downstream portions of DPF 12 will be referred to only "pressure difference at DPF 12", in the following.

Based on the pressure difference sensed by sensor 17, engine control unit 13 estimates an amount of PM collected by DPF 12 with reference to a predetermined characteristic table. Based on the estimated amount of the collected PM, the engine control unit 13 judges or determines a reactivation time of DPF 12, and when the reactivation time is judged, a reactivation operation is carried out subject to a condition wherein the reactivation operation is allowed by the operation condition of engine 1.

Figure 4:
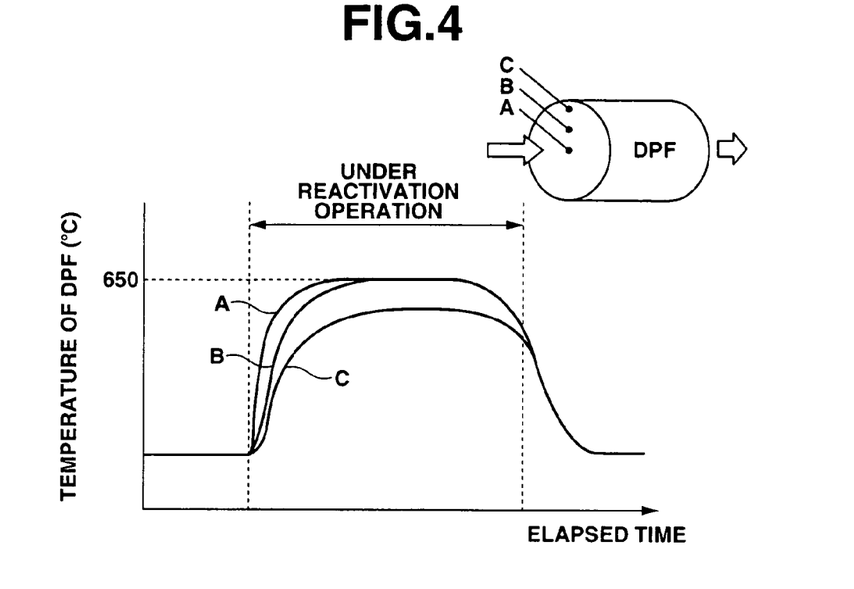
FIG. 4 is a graph showing a relationship between temperature of three portions of the DPF and elapsed time under reactivation operation of the same.

FIG. 4 is a graph showing the temperature of three portions "A", "B" and "C" of the interior of DPF 12 with respect to elapsed time under reactivation operation of the same. As shown, portion "A" is a center portion, portion "B" is an intermediate portion and portion "C" is a peripheral portion of DPF 12.

As is seen from this graph, upon starting of the reactivation, the portions "A", "B" and "C" are heated up to about 650° C. However, since these portions "A", "B" and "C" are heated by the exhaust gas having inevitably an uneven flow distribution, the entire of the interior bed of DPF 12 is not evenly heated. Thus, as is seen from the graph, the peripheral portion "C" shows a temperature that is somewhat lower than that of the center portion "A". Accordingly, burning (or removing) of PM in DPF 12 starts from the center portion "A" and then gradually spreads toward the peripheral portion "C".

When the reactivation of DPF 12 is completely made, almost all of PM collected by DPF 12 is burnt and thus fully removed therefrom.

Figure 5A:
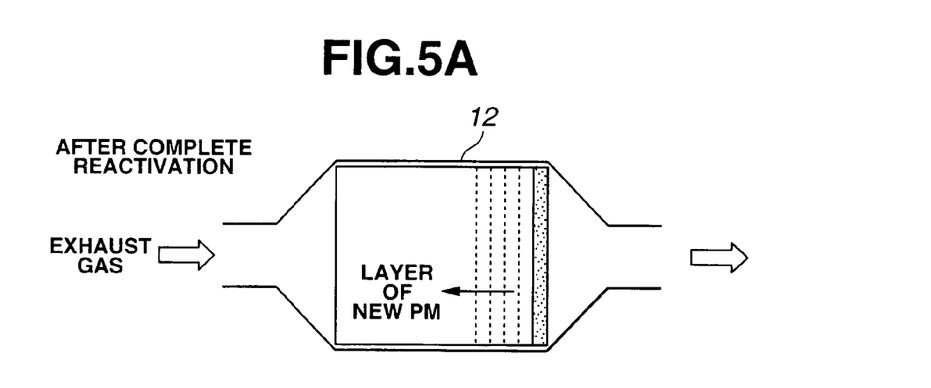
FIGS. 5A and 5B are sectional views of the DPF respectively showing a condition wherein the filter has been fully reactivated and a condition wherein the filter has been partially reactivated.

Accordingly, as is seen from FIG. 5A, once the reactivation has been completely made, new particulate matter (new PM) in the exhaust gas from engine 1 is gradually accumulated and stratified evenly on a downstream end portion of DPF 12. In this case, undesired uneven dispersion of the new PM in DPF 12 is not produced. It is to be noted that the PM is collected in the cell spaces 22A of the first group of DPF 12 (see FIG. 3).

Figure 5B:
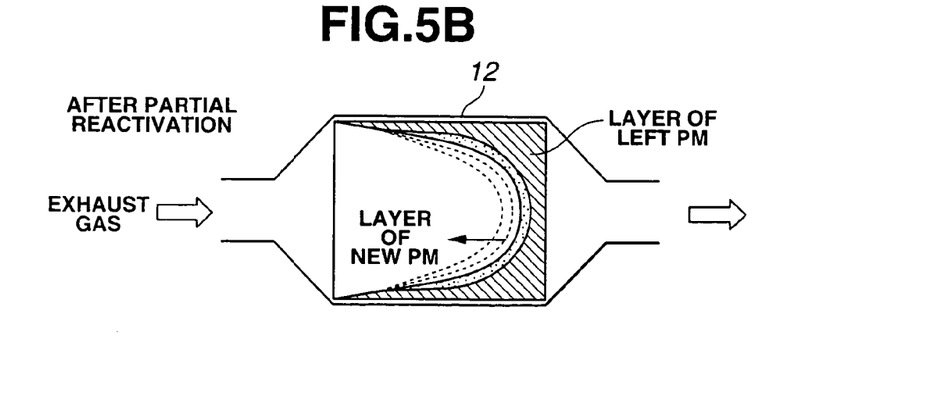

While, as is seen from FIG. 5B, when the reactivation has been partially made due to a break or stopping of the full reactivation, a larger amount of old PM is left in the peripheral portion of the interior bed of DPF 12 because of the nature of the temperature distribution appearing in DPF 12. That is, due to presence of the old PM left in the peripheral portion, there is produced a concave layer of the left PM. Thus, thereafter, new particulate matter (new PM) in the exhaust gas from engine 1 is gradually accumulated on a surface of the concave layer of the left PM constituting a concave layer of the new and left PM that has a small amount of PM in the center portion thereof and a larger amount of PM in the peripheral portion thereof. Thus, in this case, undesired uneven dispersion of the PM in DPF 12 is produced, as shown.

As is easily understood from FIGS. 5A and 5B, when the diesel particulate filters 12 of the drawings are fed with the same amount of new PM, DPF 12 of FIG. 5B shows a pressure loss that is smaller than that of DPF 12 of FIG. 5A. That is, uneven dispersion of the PM in DPF 12 brings about such lower pressure loss.

Accordingly, if, with DPF 12 assuming the lower pressure loss condition of FIG. 5B, the amount of PM collected by DPF 12 is estimated based on the pressure difference at DPF 12 at the time when DPF 12 assumes the higher pressure loss condition of FIG. 5A, there is produced an error.

Figure 6:
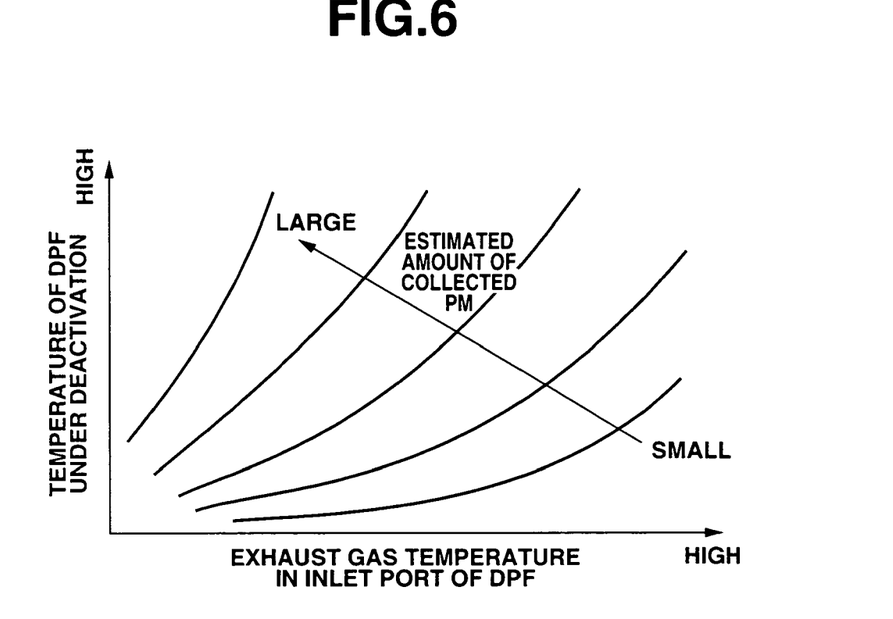
FIG. 6 is a graph showing a relationship between an exhaust gas temperature at inlet port of the DPF and a temperature of the DPF under reactivation of the DPF with reference to an amount of collected PM.

Accordingly, if, in the condition of FIG. 5B, the reactivation of DPF 12 is started when the estimated amount of collected PM reaches a predetermined value, the temperature of DPF 12 is suddenly increased and readily exceeds its critical value. That is, under such condition, the amount of PM actually collected by DPF 12 is greater than that collected in the condition of FIG. 5A, and thus, as is seen from the graph of FIG. 6 that shows the relationship between the amount of collected PM, the exhaust gas temperature in an inlet port of DPF 12 and the temperature of DPF 12 under the reactivation, the temperature of DPF 12 is greatly and abnormally increased.

Figure 7:
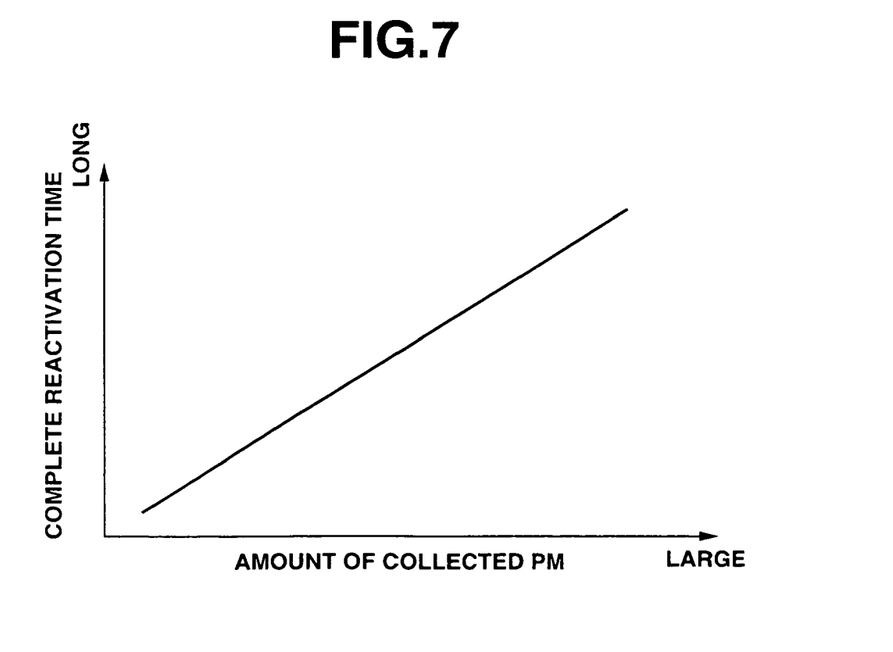
FIG. 7 is a graph showing a relationship between the amount of collected PM and a complete reactivation time.

FIG. 7 is a graph showing the relationship between the amount of collected PM and a complete reactivation time. As is seen from this graph, in case wherein a reactivation termination time on which the reactivation operation terminates is determined based on the estimated amount of collected PM that is derived from the pressure difference at DPF 12, estimation of the smaller amount of collected PM induces inevitably a shorter reactivation time. That is, the reactivation operation is caused to stop before the complete reactivation is established, and thus, pretty amount of untreated or non-burnt PM is still left in DPF 12.

In view of the above-mentioned undesirable facts, the following measures are used in the present invention for removing the estimation error.

In the invention, two characteristic tables, that is, first and second characteristic tables are used for estimating the amount of collected PM based on the pressure difference at DPF 12.

That is, the first characteristic table is for the estimation after the complete reactivation (see FIG. 5A), and the second characteristic table is for the estimation after the partial reactivation (see FIG. 5B).

Figure 8A:
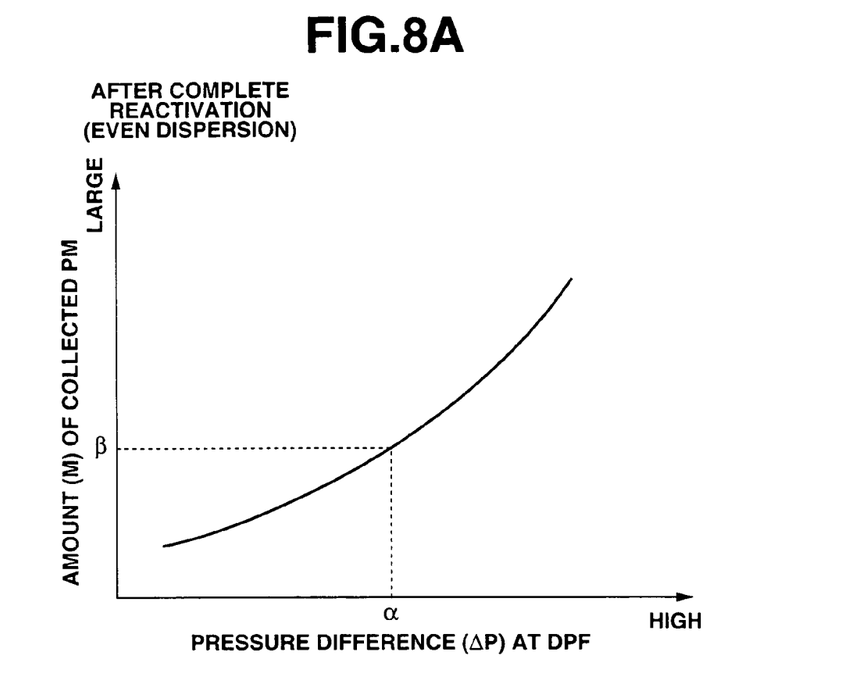
FIGS. 8A and 8B are graphs each showing a relationship between the amount of collected PM and a pressure difference between upstream and downstream portions of the DPF, FIG. 8A showing the relationship established after the filter has been fully reactivated, and FIG. 8B showing the relationship established after the filter has been partially reactivated.
Figure 8B:
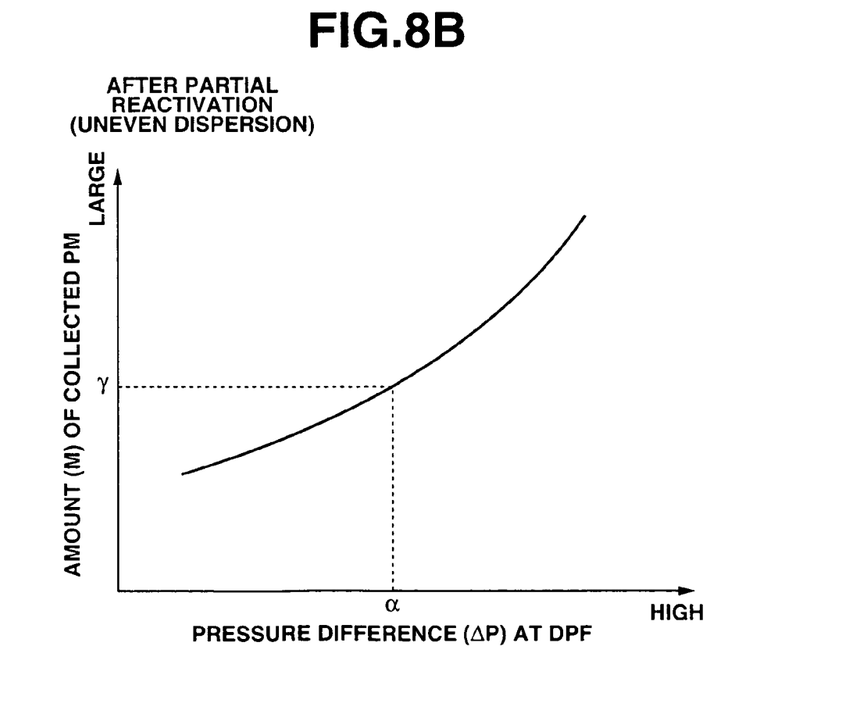

FIG. 8A shows the first characteristic table used for estimating the amount of collected PM after the complete reactivation, and FIG. 8B shows the second characteristic table used for estimating the amount of collected PM after the partial reactivation.

In the first characteristic table of FIG. 8A, a value "α" of the pressure difference at DPF 12 indicates a value "β" of the amount of collected PM, and in the second characteristic table of FIG. 8B, the value "α" of the pressure difference at DPF 12 indicates a value "γ" of the amount of collected PM. It is now to be noted that the value "γ" is larger than the value "β". That is, $$\gamma > \beta \tag{1}$$

That is, even with the same pressure difference "α" at DPF 12, a larger estimated amount of collected PM is computed in case of the uneven dispersion (see FIG. 5B) of the collected PM in DPF 12, that is larger than that computed in case of the even dispersion (see FIG. 5A) of the collected PM in DPF 12. With this measure, an appropriate compensation is applied to the apparent reduction in pressure loss caused by the uneven dispersion of the collected PM in DPF 12.

In desired, more than two characteristic tables may be provided which use a degree of even or uneven dispersion of the collected PM in DPF 12 as one factor. That is, various characteristic tables may be provided in accordance with the break condition of the reactivation of DPF 12. In this case, a desired temperature for the reactivation, a desired time for keeping the reactivation and the like may be put into a consideration.

In the following, programmed operation steps executed by engine control unit 13 will be described in detail with reference to the flowcharts of FIGS. 9 and 10.

Figure 9:
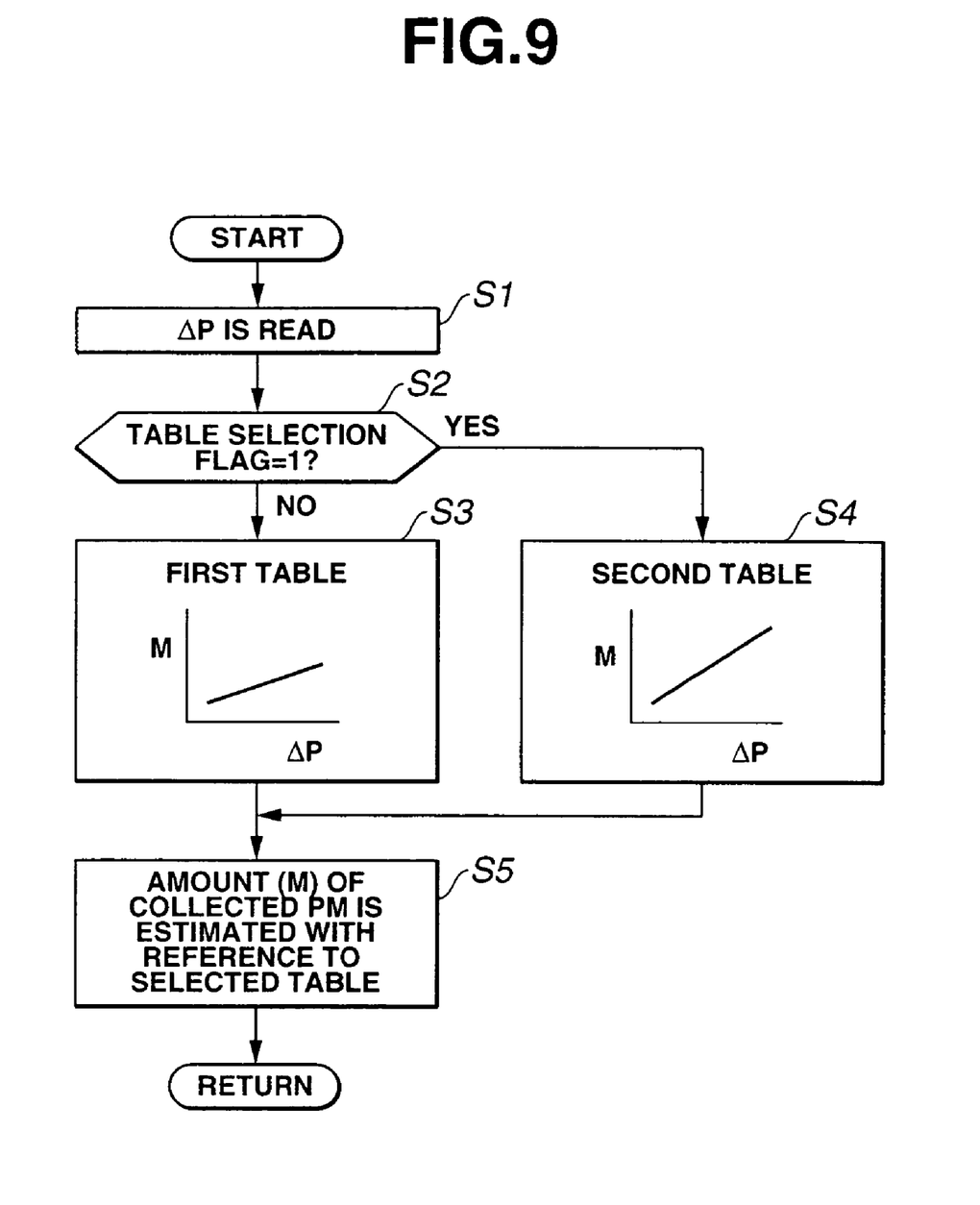
FIG. 9 is a flowchart showing operation steps executed by a control unit for estimating the amount of PM collected by the DPF.

The flowchart of FIG. 9 shows the operation steps for estimating the amount of collected PM in DPF 12. This routine is repeated every given period.

At step S1, a pressure difference "ΔP" at DPF 12 is read. The pressure difference "ΔP" is detected by pressure difference sensor 17 (see FIG. 1). At step S2, with reference to a result of operation of an after-mentioned characteristic table selection of FIG. 10, judgment is carried out as to whether the flag of the characteristic table selection indicates 1 (one) or not. If NO, that is, when the flag indicates 0 (zero) meaning that a complete reactivation has been effected, the operation flow goes to step S3. While, if YES, that is, when the flag indicates 1 meaning that a partial reactivation has been effected, the operation flow goes to step S4.

At step S3, the first characteristic table of FIG. 8A is selected, which is for estimating the amount of collected PM after the complete reactivation. The first characteristic table of FIG. 8A is a normal table that has been provided based on various data of experiments with respect to the pressure differences "ΔP" exhibited by DPF 12. Then, the operation flow goes to step S5.

At step S4, the second characteristic table of FIG. 8B is selected, which is for estimating the amount of collected PM after the partial reactivation. The second characteristic table of FIG. 8B is a table that is different from the above-mentioned normal table of FIG. 8A. That is, as has been mentioned hereinabove, the second characteristic table of FIG. 8B shows a somewhat higher value of the amount of collected PM than that of the first characteristic table of FIG. 8A with respect to the same different pressure "ΔP" at DPF 12. Then, the operation flow goes to step S5.

At step S5, with reference to the first characteristic table selected at step S3 or the second characteristic table selected at step S4, the amount (M) of collected PM is estimated based on the pressure difference "ΔP" read at step S1.

Although not shown in the flowchart, to inevitable change of the pressure difference "ΔP" at DPF 12 that is caused by change of the exhaust gas flow rate, it is desirable to make the following correction to the estimated amount of collected PM. That is, when the amount of collected PM is the same, the pressure difference "ΔP" increases with increase of the exhaust gas flow rate. Thus, based on information signals from engine speed sensor 14 and engine load sensor 15, an exhaust gas flow rate is estimated with reference to a map, and then, based the estimated exhaust gas flow rate, the estimated amount of collected PM is corrected.

Figure 10:
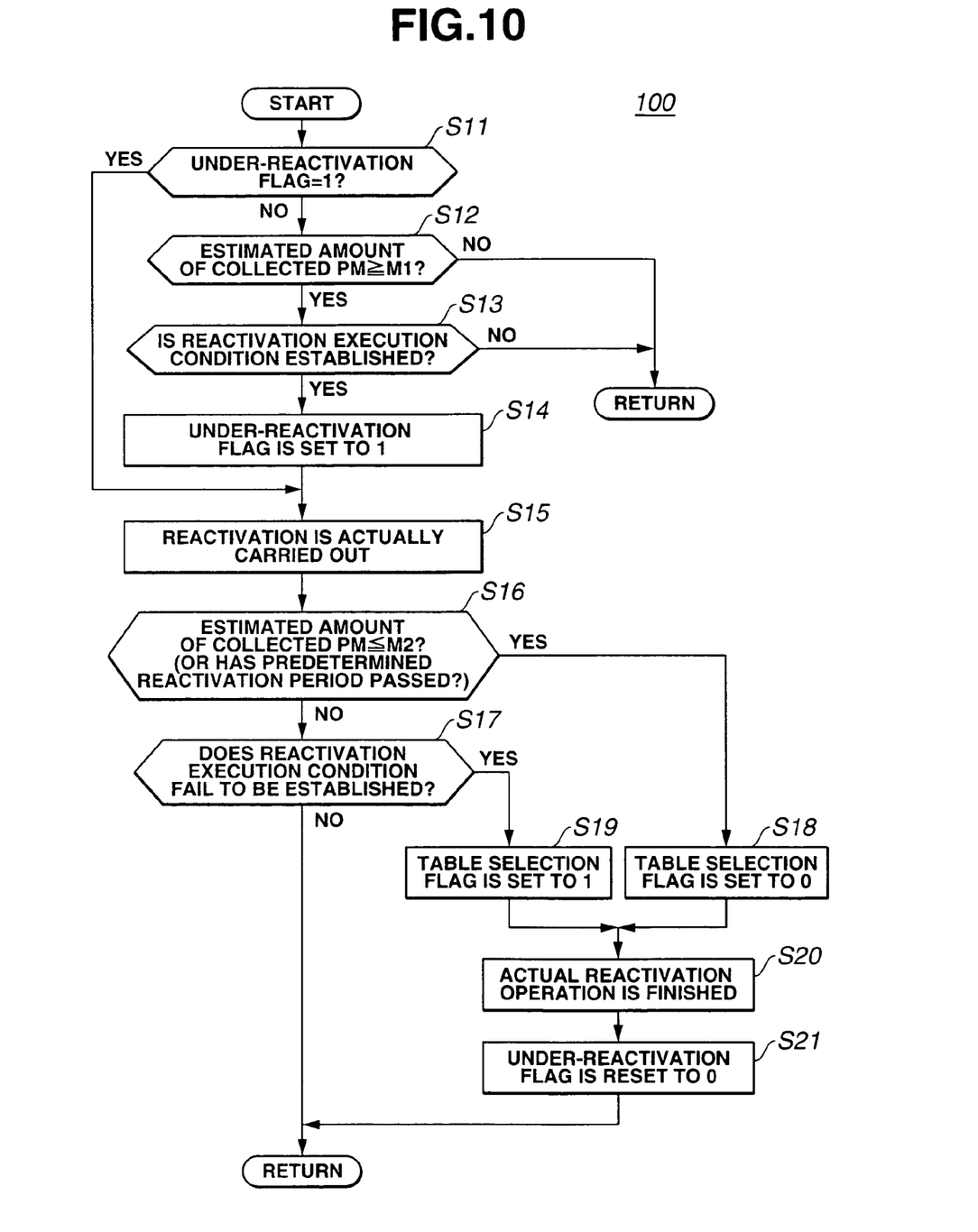
FIG. 10 is a flowchart showing operation steps executed by the control unit for controlling the reactivation of the DPF in case of a first embodiment of the present invention.

The flowchart of FIG. 10 shows the operation steps for controlling the reactivation of DPF 12. Also, this routine is repeated every given period.

At step 511, judgment is carried out as to whether the flag of under-reactivation indicates 1 (one) or not. If NO, that is, when the flag indicates 0 (zero) meaning that the reactivation is not under operation, the operation flow goes to step S12. While, if YES, that is, when the flag indicates 1 meaning that the reactivation is under operation, the operation flow goes to step S15 which will be described hereinafter.

At step S12, judgment is carried out as to whether the estimated amount (M) of collected PM provided by the routine of FIG. 9 is equal to or greater than a predetermined first value "M1" or not. The predetermined first value "M1" is a threshold value for determining the time when the reactivation of DPF 12 is needed. If NO, that is, when the estimated amount (M) is smaller than the predetermined first value "M1", the operation flow returns. While, if YES, that is, when the estimated amount (M) is equal to or greater than the predetermined first value "M1", the operation flow goes to step S13.

At step S13, judgment is carried out as to whether the existing operation condition agrees with a reactivation execution condition or not. If NO, that is, when the reactivation execution condition is not established, the operation flow returns. While, if YES, that is, when the reactivation execution condition is established, that is, when the engine 1 rotates at a speed higher than a predetermined level except the time of engine idling and/or at a load higher than a predetermined level or when the associated vehicle moves at a speed higher than a predetermined level, the operation flow goes to step S14 for the purpose of carrying out the reactivation operation.

At step S14, the under-reactivation flag is set to 1 (one), and then the operation flow goes to step S15. Once the under-reactivation flag has been set to 1, a subsequent flow of the main routine makes step S11 YES, and thus, in such case, the operation flow runs from S11 to S15 directly.

At step S15, the reactivation operation is actually carried out in DPF 12. That is, the exhaust gas led to DPF 12 is heated up to heat up DPF 12 for burning and removing PM collected in DPF 12. For heating the exhaust gas led to DPF 12, various measures may be used, which are, for example, retardation of fuel injection timing of fuel injection valves 9, post-injection that is an additional fuel injection carried out in an expansion or exhaust stroke of piston, reducing the open degree of intake throttle valve 7, reducing the super-changed pressure generated by variable throat type supercharger 4, etc.,. With these measures, the interior temperature of DPF 12 is increased to a degree that causes burning of the PM collected in DPF 12. If desired, a target reactivation temperature may be set, and based on this target reactivation temperature, the fuel injection timing, the post-injection amount, the open degree of intake throttle valve 7 or the super-charged pressure may be set.

At step S16, judgment is carried out as to whether the reactivation of DPF 12 has been completely carried out or not. For this judgment, judgment is carried out whether an updated amount (M) of collected PM estimated by the routine of FIG. 9 is smaller than a predetermined second value "M2" or not. It is to be noted that the predetermined second value "M2" is smaller than the above-mentioned predetermined first value "M1". In place of the above-mentioned judgment, another judgment may be used for checking whether the reactivation of DPF 12 has been completely carried out or not. That is, in this judgment, determination is carried out as to whether a predetermined period has passed for the reactivation operation or not.

If NO at step S16, that is, when the updated estimated amount (M) of collected PM is greater than the second value "M2" (or the predetermined reactivation time has not passed), the operation flow goes to step S17 judging that the complete reactivation has not been established yet.

At step S17, for judging whether a predetermined reactivation break condition is fulfilled or not, judgment is carried out as to whether the above-mentioned reactivation execution condition fails to be established or not. If NO, that is, when the reactivation execution condition is still established, the operation flow returns to continue the reactivation operation.

If YES at step S16, that is, when the updated estimated amount (M) of collected PM is equal to or smaller than the second value "M2" (or the predetermined reactivation time has passed), the operation flow goes to step S18 judging that the complete reactivation has been established.

At step S18, the table selection flag is set to 0 (zero) because of establishment of the complete reactivation of DPF 12, and then the operation flow goes to step S20. That is, usage of the first characteristic table of FIG. 8A is determined. It is to be noted that the value of the table selection flag is kept memorized by a back-up RAM of the control unit 13 even after stopping the engine 1.

If YES at step S17, that is, when the reactivation execution condition fails to be established, the operation flow goes to step S19 judging that the reactivation should be broken or stopped.

At step S19, the table section flag is set to 1 (one) because of failure of establishment of the complete reactivation of DPF 12 (viz., establishment of a partial reactivation of DPF 12), and then the operation flow goes to step S20. That is, usage of the second characteristic table of FIG. 8B is determined.

At step S20, the actual reactivation operation is finished. That is, all parameters that have changed in value at step S15 for the actual reactivation are all returned to their original values. The original values are normal values provided in accordance with the operation condition of the engine 1. Then, the operation flow goes to step S21 where the under-reactivation flag is reset to 0 (zero) and the operation flow returns.

In the operation steps of the flowcharts of FIGS. 9 and 10, step S1 constitutes a pressure difference detecting means that detects the pressure difference between the upstream and downstream portions of DPF 12, S5 constitutes a collected PM amount estimating means that estimates the amount of PM collected by DPF 12, S12 constitutes a reactivation timing judging means that judges a reactivation time when the reactivation of DPF 12 is needed, S15 constitutes a reactivation carrying out means that actually carries out the reactivation of DPF 12, S16 to S19 constitute a dispersion condition judging means that judges the dispersion condition of the collected PM in DPF 12, and steps S2 to S4 constitute a correcting means that corrects the estimated amount of collected PM provided by the collected PM amount estimating means.

In the following, advantages of the above-mentioned first embodiment 100 will be described.

In this embodiment, the dispersion condition of the collected PM in DPF 12 is judged, and based on this judged dispersion condition, the amount of the collected PM estimated based on the pressure difference at DPF 12 is varied or corrected. Thus, the estimation accuracy of the collected PM amount is increased or improved irrespective of the dispersion condition of the collected PM. Accordingly, the reactivation action for DPF 12 can be started constantly at the time when the collected PM shows the same amount, and thus, undesired overheating of DPF 12 can be avoided.

In the embodiment 100, a plurality of different characteristic tables are provided each showing a relationship between a pressure difference at DPF 12 and an estimated amount of collected PM, and the characteristic tables are selectively switched for the estimation of the amount of collected PM in accordance with a dispersion condition of the collected PM in DPF 12. Particularly in case wherein uneven dispersion of the collected PM is severe, a characteristic table is selected which indicates a larger amount of collected PM at the same pressure difference at DPF 12 than that indicated in case wherein even dispersion of the collected PM is made in DPF 12. Thus, the correction of the estimated amount of the collected PM is easily achieved.

In the embodiment 100, after the reactivation of DPF 12 is actually carried out, judgment is carried out as to whether the reactivation in question was a complete reactivation that is a reactivation satisfying a predetermined complete reactivation condition or a partial reactivation that is reactivation satisfying a predetermined reactivation break condition, and by using the result of this judgment, the dispersion condition of the collected PM is detected. Thus, judgment of the dispersion condition of the collected PM is easily achieved.

Figure 11:
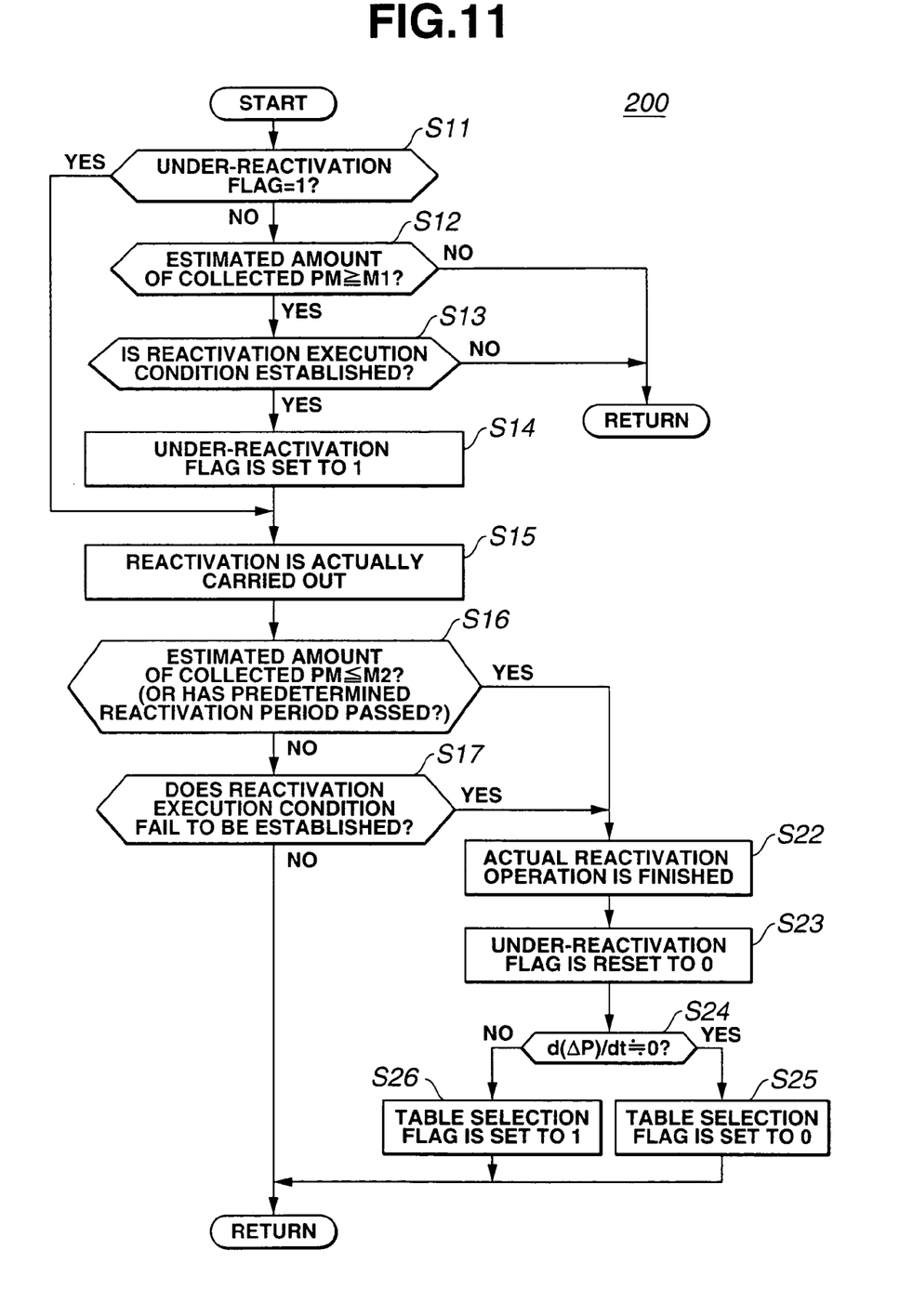
FIG. 11 is a flowchart showing operation steps executed by a control unit for controlling the reactivation of the DPF in case of a second embodiment of the present invention.

Referring to FIG. 11, there is shown a flowchart for use in a second embodiment 200 of the present invention, which is used in place of the flowchart of FIG. 10.

As will be understood when comparing the flowcharts of FIGS. 10 and 11, the operation steps of the second embodiment 200 are different from the first embodiment 100 only at the operation flows provided after YES answer at steps S16 and S17.

If YES at steps S16 and S17, the operation flow goes to step S22. At this step, the actual reactivation operation is finished. Then, at step S23, the under-reactivation flag is reset to 0. Then, the operation flow goes to step S24. At this step S24, an updated pressure difference "ΔP" at DPF 12 detected by the routine of FIG. 9 is read and its rate of change "d(ΔP)/dt" is calculated, and judgment is carried out as to whether the rate of change "d(ΔP)/dt" at the time when the actual reactivation operation has finished is about 0 (zero) or not.

If YES, that is, when the rate of change "d(ΔP)/dt" is about 0 (zero), the operation flow goes to step S25 judging that the reactivation was a complete reactivation. At this step S25, the table selection flag is set to 0 (zero) and the operation flow returns.

While, if NO at step S24, that is, when the rate of change "d(ΔP)/dt" is not about 0 (zero), the operation flow goes to step S26 judging that the reactivation was a partial reactivation. At this step S26, the table selection flag is set to 1 (one) and the operation flow returns.

In this second embodiment 200, the steps S24 to S26 constitute a dispersion condition judging means a dispersion condition judging means that judges the dispersion condition of the collected PM in DPF 12.

In the second embodiment 200, judgment of the dispersion condition of the collected PM is carried out based on the pressure difference at DPF 12 appearing after finishing of the actual reactivation operation. With this, estimation on the collected PM dispersion condition is much exactly carried out. Thus, employment of numerous characteristic tables brings about much accurate correction of the estimated amount of collected PM provided by the collected PM amount estimating means (S5).

The entire contents of Japanese Patent Application 2003-004947 (filed Jan. 10, 2003) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An exhaust gas purifying system of an internal combustion engine, comprising:
    a particulate matter (PM) filter installed in an exhaust passage line extending from the engine, the PM filter collecting particulate matter in the exhaust gas from the engine;
    a pressure difference sensor for detecting a pressure difference between upstream and downstream portions of the PM filter;
    a control unit which includes a collected PM amount estimating section that estimates an amount of collected PM in the PM filter based on the pressure difference; and a reactivation timing judging section that, based on the estimated amount of the collected PM, judges a reactivation time when the reactivation of the PM filter is needed; and a reactivation carrying out system that, upon judgment of the reactivation time, carries out a predetermined operation to increase the temperature of the PM filter thereby to burn the collected PM in the PM filter, wherein the control unit further comprises:
- a dispersion condition judging section that judges a dispersion condition of the collected PM in the PM filter; and
- a correction section that corrects the estimated amount of the collected PM in accordance with the judged dispersion condition of the collected PM.

2. An exhaust gas purifying system as claimed in claim 1, in which the correction section comprises a plurality of different characteristic tables each showing a relationship between the pressure difference at the PM filter and the estimated amount of collected PM in the PM filter with respect to the dispersion condition of the collected PM in the PM filter.

3. An exhaust gas purifying system as claimed in claim 2, in which the different characteristic tables are selectively switched for the estimation of the amount of collected PM in accordance with the dispersion condition of the collected PM in the PM filter.

4. An exhaust gas purifying system as claimed in claim 3, in which the characteristic tables comprise:
- a first characteristic table which is used for estimation of the amount of the collected PM in the PM filter when the dispersion condition judging section judges that the collected PM in the PM filter shows an even dispersion condition;
- a second characteristic table which is used for estimation of the amount of the collected PM in the PM filter when the dispersion condition judging section judges that the collected PM in the PM filter shows an uneven dispersion condition,
- wherein the second characteristic table shows a higher estimated amount of collected PM than that the first characteristic table shows at the same pressure difference.

5. An exhaust gas purifying system as claimed in claim 1, in which once a reactivation operation of the PM filter is carried out by the reactivation carrying out system, the dispersion condition judging section carries out a judgment as to whether the reactivation operation thus carried out is a complete reactivation operation or an incomplete reactivation operation.

6. An exhaust gas purifying system as claimed in claim 4, in which once a reactivation operation of the PM filter is carried out by the reactivation carrying out system, the dispersion condition judging section carries out a judgment as to whether the reactivation operation thus carried out is a complete reactivation operation that brings about the even dispersion condition of the collected PM or an incomplete reactivation operation that brings about the uneven dispersion condition of the collected PM.

7. An exhaust gas purifying system as claimed in claim 6, in which the complete reactivation operation is judged when the reactivation operation has been made fulfilling a predetermined complete reactivation condition, and the incomplete reactivation operation is judged when the reactivation operation has been made fulfilling a predetermined reactivation break condition.

8. An exhaust gas purifying system as claimed in claim 1, in which the dispersion condition judging section judges the dispersion condition of the collected PM on the basis of rate of change $(d(\Delta P)/dt)$ of the pressure difference at the PM filter at the time when the reactivation operation is finished.

9. An exhaust gas purifying system as claimed in claim 1, in which the reactivation carrying out system functions to heat up the exhaust gas of the engine by retardation of fuel injection timing of an associated fuel injection valve, post injection that is an additional fuel injection carried out in an expansion stroke or exhaust stroke of an associated piston, reducing an open degree of an intake throttle valve or reducing a super-charged pressure generated by a variable throat type supercharger.

10. An exhaust gas purifying system of a diesel engine having an exhaust passage line, comprising:
- a particulate matter (PM) filter installed in the exhaust passage line for collecting particulate matter in the exhaust gas from the engine;
- a pressure difference sensor for detecting a pressure difference between upstream and downstream portions of the PM filter;
- a reactivation carrying out system that, upon need of a reactivation of the PM filter, carries out a predetermined operation to increase the temperature of the PM filter thereby to burn the collected PM in the PM filter; and
- a control unit that controls the operation of the reactivation carrying out system, wherein the control unit comprises;
- a collected PM amount estimating section that estimates an amount of collected PM in the PM filter based on the pressure difference at the PM filter;
- a dispersion condition judging section that judges a dispersion condition of the collected PM in the PM filter;
- a correction section that corrects the estimated amount of the collected PM in accordance with the judged dispersion condition of the collected PM; and
- a reactivation timing judging section that, based on the corrected estimated amount of the collected PM, judges a reactivation time when the reactivation of the PM is actually needed.

11. In an exhaust gas purifying system of an internal combustion engine including a particulate matter (PM) filter that is installed in an exhaust passage line extending from the engine for collecting particulate matter in the exhaust gas from the engine, a pressure difference sensor that detects a pressure difference between upstream and downstream portions of the PM filter, and a reactivation carrying out system that, upon need of a reactivation of the PM filter, carries out a predetermined operation to increase the temperature of the PM filter thereby to burn the collected PM in the PM filter,
- a method of controlling the exhaust gas purifying system comprising:
  - estimating an amount of collected PM in the PM filter based on the pressure difference;
  - judging a dispersion condition of the collected PM in the PM filter;
  - correcting the estimated amount of the collected PM in accordance with the judged dispersion condition of the collected PM;
  - judging, based on the corrected estimated amount of the collected PM, a reactivation time when the reactivation of the PM filter is needed; and
  - operating the reactivation carrying out system upon judgment of the reactivation time.

12. An exhaust gas purifying system as claimed in claim 1, in which once a reactivation operation of the PM filter is carried out by the reactivation carrying out system, the dispersion condition judging section carries out a judgment as to whether the reactivation operation thus carried out is a complete reactivation operation that brings about an even dispersion condition of the collected PM or an incomplete reactivation operation that brings about an uneven dispersion condition of the collected PM.

13. An exhaust gas purifying system as claimed in claim 10, in which once a reactivation operation of the PM filter is carried out by the reactivation carrying out system, the dispersion condition judging section carries out a judgment as to whether the reactivation operation thus carried out is a complete reactivation operation that brings about an even dispersion condition of the collected PM or an incomplete reactivation operation that brings about an uneven dispersion condition of the collected PM.

14. A method of controlling the exhaust gas purifying system as claimed in claim 11, in which once a reactivation operation of the PM filter is carried out by operating the reactivation carrying out system, carrying out a judgment as to whether the reactivation operation thus carried out is a complete reactivation operation that brings about an even dispersion condition of the collected PM or an incomplete reactivation operation that brings about an uneven dispersion condition of the collected PM.

* * * * *